(12) United States Patent
Zweigle et al.

(10) Patent No.: US 11,987,114 B2
(45) Date of Patent: May 21, 2024

(54) HOUSING FOR A DRIVE SYSTEM, AND METHOD FOR PRODUCING A HOUSING FOR A DRIVE SYSTEM

(71) Applicant: Robert Bosch GmbH, Stuttgart (DE)

(72) Inventors: Peter Zweigle, Ditzingen (DE); Fabian Eiberger, Gerlingen (DE); Nina Mohr, Stuttgart (DE); Timo Heusel, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 17/915,231

(22) PCT Filed: Mar. 18, 2021

(86) PCT No.: PCT/EP2021/056976
§ 371 (c)(1),
(2) Date: Sep. 28, 2022

(87) PCT Pub. No.: WO2021/197865
PCT Pub. Date: Oct. 7, 2021

(65) Prior Publication Data
US 2023/0125790 A1    Apr. 27, 2023

(30) Foreign Application Priority Data

Apr. 2, 2020 (DE) ..................... 10 2020 204 293.4

(51) Int. Cl.
*B60K 11/02* (2006.01)
(52) U.S. Cl.
CPC .................... *B60K 11/02* (2013.01)
(58) Field of Classification Search
CPC .................................................... B60K 11/02
See application file for complete search history.

(56) References Cited

U.S. PATENT DOCUMENTS 5,585,681 A 12/1996 Bitsche
2019/0178365 A1* 6/2019 Ishikawa ............. F16H 57/0493

FOREIGN PATENT DOCUMENTS

DE   102011076525 A1   11/2012
DE   102012112377 A1    6/2014
DE   102014206845 A1   10/2015
WO     2013160014 A1   10/2013
WO     2018098567 A1    6/2018

OTHER PUBLICATIONS

Translation of International Search Report for Application No. PCT/EP2021/056976 dated Apr. 26, 2021 (3 pages).

* cited by examiner

*Primary Examiner* — Jacob M Amick
(74) *Attorney, Agent, or Firm* — Michael Best & Friedrich LLP

(57) ABSTRACT

The invention relates to a housing for drive system, in particular for a motor vehicle, comprising: a first housing portion for receiving a stator of the drive system; and a second housing portion for receiving a transmission arrangement, a first coolant channel for cooling the stator being formed in or on the first housing portion, and a second coolant channel for cooling the transmission arrangement being formed in or on the second housing portion, and the first coolant channel being fluidically connected to the second coolant channel such that a coolant can be conducted through the first coolant channel into the second coolant channel.

16 Claims, 4 Drawing Sheets

HOUSING FOR A DRIVE SYSTEM, AND METHOD FOR PRODUCING A HOUSING FOR A DRIVE SYSTEM

BACKGROUND

The present invention relates to a housing for a drive system. In particular, the invention relates to a housing for a drive system of a motor vehicle. The invention further relates to a method for producing a housing for a drive system, in particular for a motor vehicle. In particular, the invention relates to a housing for electric drive systems, in particular of electric or hybrid vehicles.

In electric drive systems, the stator can be cooled by coolant being conducted around the stator between an outer system housing and an inner stator housing portion. To this end, a coolant channel circulating around the inner housing can be provided. The outer system housing is separated from the inner stator housing portion by seals. The transmission is located on the other side of the seals and is not cooled, or at least not substantially cooled, by the coolant. A further cooling arrangement is disclosed in DE 10 2014 206845 A1.

In order to cool also the transmission, a further cooling circuit which requires additional material and space is necessary.

SUMMARY

According to a first aspect, the invention accordingly relates to a housing for a drive system, in particular for a motor vehicle, having a first housing portion and a second housing portion. The first housing portion serves for receiving a stator of the drive system. The second housing portion serves for receiving a transmission arrangement. A first coolant channel for cooling the stator is formed in or on the first housing portion, wherein a second coolant channel for cooling the transmission arrangement is formed in or on the second housing portion. The first coolant channel is fluidically connected to the second coolant channel such that a coolant can be conducted through the first coolant channel into the second coolant channel.

According to a second aspect, the invention accordingly relates to a method for producing a housing for a drive system, in particular for a motor vehicle. A first housing portion is formed for receiving a stator of the drive system. Moreover, a second housing portion is formed for receiving a transmission arrangement. A first coolant channel for cooling the stator is formed in or on the first housing portion, and a second coolant channel for cooling the transmission arrangement is formed in or on the second housing portion. The first coolant channel is fluidically connected to the second coolant channel such that a coolant can be conducted through the first coolant channel into the second coolant channel.

Advantages of the Invention

The invention makes it possible to cool both the stator and the transmission arrangement by a single cooling circuit. A requirement for additional material and space for a further cooling circuit can be avoided thereby.

According to a further embodiment of the housing, the first housing portion also has a third coolant channel which is fluidically connected to the second coolant channel, wherein the first coolant channel has a coolant inlet for the inlet of the coolant, and wherein the third coolant channel has a coolant outlet for the outlet of the coolant. According to embodiments of the housing, the third coolant channel can run in the region of the stator or run around said stator and additionally cool said stator thereby.

According to a further embodiment of the housing, the first coolant channel is at least partially fluidically separated from the third coolant channel by a web. In particular, it can be provided that the web fluidically separates the first coolant channel entirely from the third coolant channel. A certain leakage can be tolerated, however, so that it can be provided that the web is partially permeable to the coolant. Preferably less than 20 percent, particularly preferably less than 10 percent, of the coolant is allowed through by the web and thus enters directly into the third coolant channel from the first coolant channel.

According to a further embodiment of the housing, the second coolant channel has a first coolant channel portion which is directly connected to the first coolant channel. Furthermore, the second coolant channel has a second coolant channel portion which is directly connected to the third coolant channel and runs parallel to the first coolant channel portion, wherein the coolant flows through the first coolant channel portion and the second coolant channel portion in an anti-parallel manner during operation. This represents a simple geometric construction.

According to a further embodiment of the housing, the second coolant channel has a third coolant channel portion which connects the first coolant channel portion to the second coolant channel portion. The third coolant channel portion can be formed, in particular, for cooling the transmission arrangement. To this end, the third coolant channel portion runs adjacent to the transmission arrangement or to the receiving region of the transmission arrangement.

According to a further embodiment of the housing for the drive system, the third coolant channel portion is of U-shaped configuration. According to further embodiments, the third coolant channel portion can also be designed as an S-shaped portion. Furthermore, according to embodiments it can be provided that the third coolant channel portion has two rib structures or combs which are intermeshed with one another such that the coolant runs through between the ribs or combs. The coolant can thereby absorb as much heat as possible in order to cool the transmission arrangement in an improved manner.

According to a further embodiment of the housing, the second housing portion has a transmission sump region for receiving transmission oil, wherein the third coolant channel portion adjoins the transmission sump region. The coolant flowing through the third coolant channel portion thereby cools the transmission oil in the transmission sump region.

According to a further embodiment of the housing, the first housing portion has an inner stator housing portion for receiving the stator and an outer stator housing portion, wherein the first coolant channel runs in a helical manner or meandering manner between the inner stator housing portion and the outer stator housing portion. According to further embodiments, the first coolant channel can also have a comb structure with interlocking cooling ribs. As a result, the stator can be efficiently cooled.

According to a further embodiment of the housing, the first coolant channel is connected to the second coolant channel via a transfer bore, a sleeve or an opening in the casting.

According to a further embodiment of the housing, structures for increasing the surface area, in particular ribs, are formed in the first coolant channel and/or in the second coolant channel. The structures for increasing the surface area help to dissipate the heat in an improved manner, such that the transmission arrangement is cooled in an improved manner.

According to a further embodiment of the housing, the first housing portion is at least partially formed by a system housing, wherein the second housing portion is at least partially formed by a transmission cover, wherein the transmission cover at least partially forms the second coolant channel, and wherein the transmission cover is connected to the system housing by means of at least one sealing element. As a result, the first coolant channel and the second coolant channel can be sealed via the transmission cover such that an additional component or an additional cover are not required. As a result, effort and costs can be reduced during production.

BRIEF DESCRIPTION OF THE DRAWINGS

In the drawings.

Elements and devices which are the same or functionally the same are provided with the same reference numerals in all of the figures.

DETAILED DESCRIPTION

Figure 1:
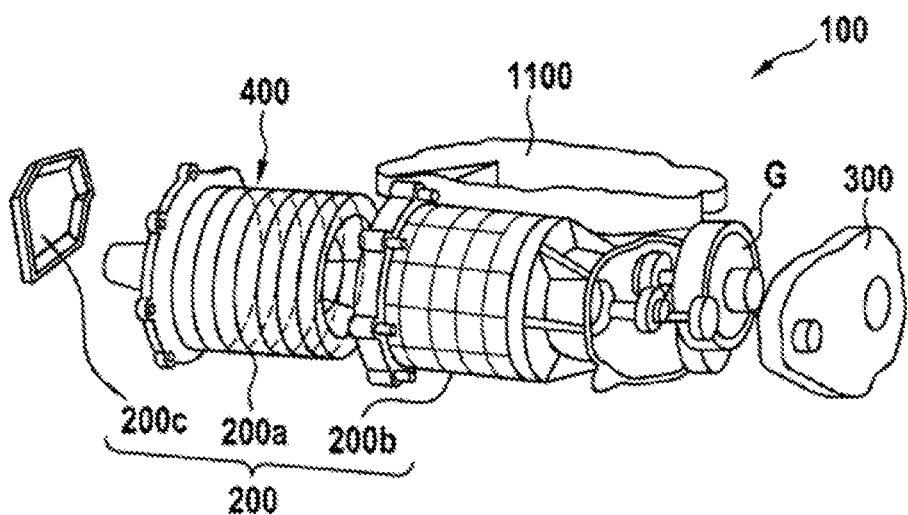
FIG. 1 shows a schematic exploded view of a housing for a drive system.

FIG. 1 shows a schematic exploded view of a housing 100 for a drive system. The illustrated housing 100 permits an improved understanding of the invention. The housing 100 comprises a first housing portion 200 and a second housing portion 300.

The first housing portion 200 comprises a front side cover 200c, an inner stator housing portion 200a and an outer stator housing portion 200b which receive a stator (not shown). The outer stator housing portion 200b is part of a system housing 1100 which can receive further components, in particular power electronics. A coolant channel 400 runs in a helical manner between the inner stator housing portion 200a and the outer stator housing portion 200b.

A coolant flows through the coolant channel 400 in order to cool the stator. The coolant can be cooling water. Further coolants, for example a cooling oil or gaseous coolants, are also possible depending on the application.

The second housing portion 300 is formed by a transmission cover which together with the system housing 1100 receives a transmission or a transmission arrangement G.

Figure 2:
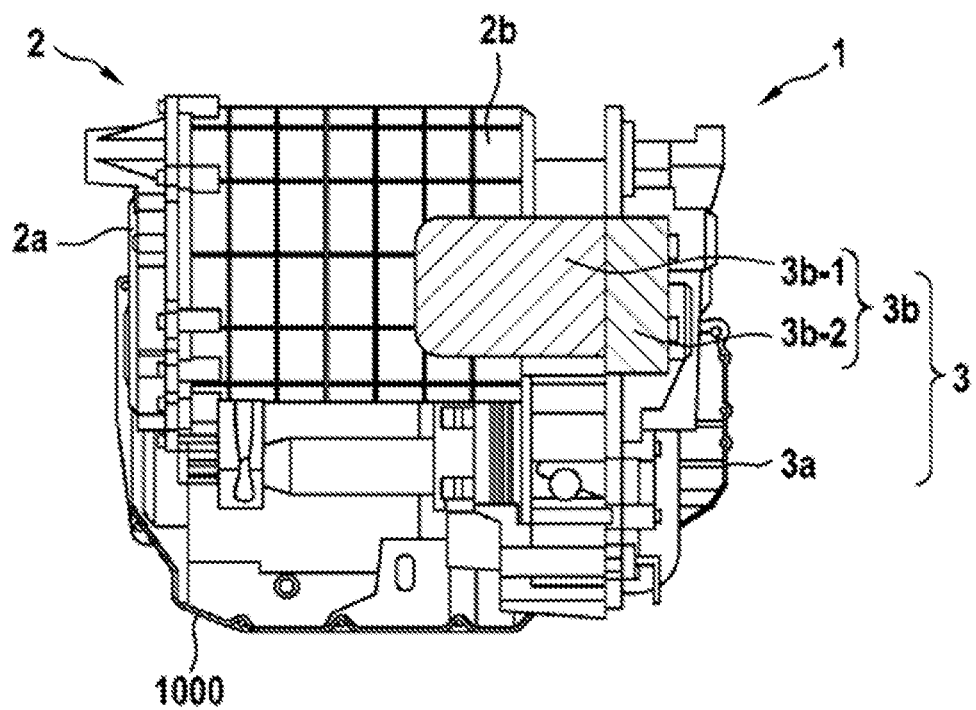
FIG. 2 shows a schematic view of a lower face of a housing for a drive system according to an embodiment of the invention.

FIG. 2 shows a schematic view of a lower face of a housing 1 for a drive system according to an embodiment of the invention. The housing 1 according to the invention differs from the housing shown in FIG. 1 in that a single cooling circuit is provided in order to cool both the stator and the transmission arrangement G.

The housing 1 comprises a first housing portion 2 with an inner stator housing portion 2a for receiving the stator S and an outer stator housing portion 2b, wherein, as in FIG. 1, a first coolant channel (not shown) runs in a helical manner between the inner stator housing portion 2a and the outer stator housing portion 2b.

Furthermore, the housing 1 comprises a second housing portion 3 which has a transmission cover 3a and a transmission cooling portion 3b with coolant channel portions. The transmission cooling portion 3b comprises a front region and a rear region 3b-1, 3b-2.

In this case, the expressions "housing portion" and "transmission cooling portion" are not to be understood to mean that they have to be separate physical entities. Rather, they can also be understood to mean sub-regions of a one-piece housing part. In particular, here the transmission cooling portion 3b can be at least partially formed by the transmission cover 3a. The transmission cooling portion 3b, however, can also be a separate component or at least partially formed by the system housing 1000.

The coolant can be removed after repeatedly flowing through.

Figure 3:
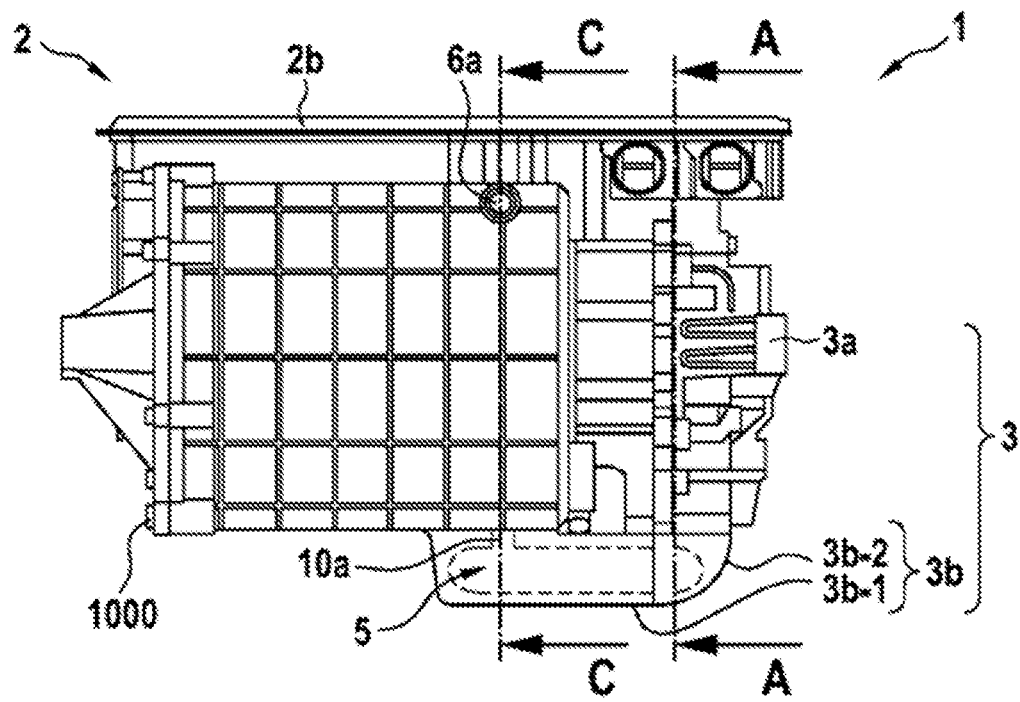
FIG. 3 shows a schematic side view of the housing for a drive system.

FIG. 3 shows a schematic side view of the housing 1 for a drive system. After flowing through the first coolant channel the coolant enters through an opening 10a into a second coolant channel 5. The opening 10a can be, for example, a transfer bore (for example introduced by an angular drilling head), sleeve or an opening in the casting. The second coolant channel 5 is connected to a third coolant channel (not shown) which runs between the inner stator housing portion 2a and the outer stator housing portion 2b and terminates in a coolant outlet 6a through which the coolant exits.

The invention is not limited to a specific position of the coolant outlet 6a. This coolant outlet can be located, for example, in the upper region or even in the lower region depending on the application. The coolant outlet 6a can also be arranged directly downstream of an oil-coolant-heat exchanger region in the lower region of the transmission cover 3a or in the system housing 1000.

Figure 4:
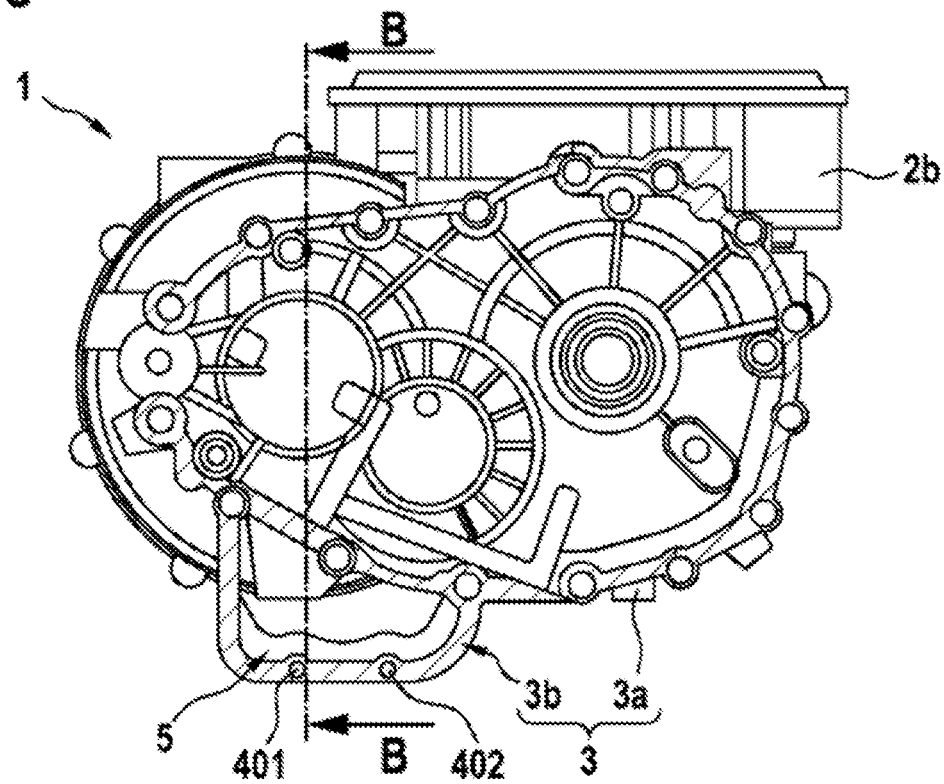
FIG. 4 shows a schematic rear view of the housing for a drive system with a partial sectional view according to the section C-C in FIG. 3.

FIG. 4 shows a schematic rear view of the housing for a drive system with a partial sectional view according to the section C-C in FIG. 3. Internal threads 401, 402 are provided in order to screw the transmission cover 3a to the system housing 1000 in order to provide a sealed cooling circuit.

Figure 5:
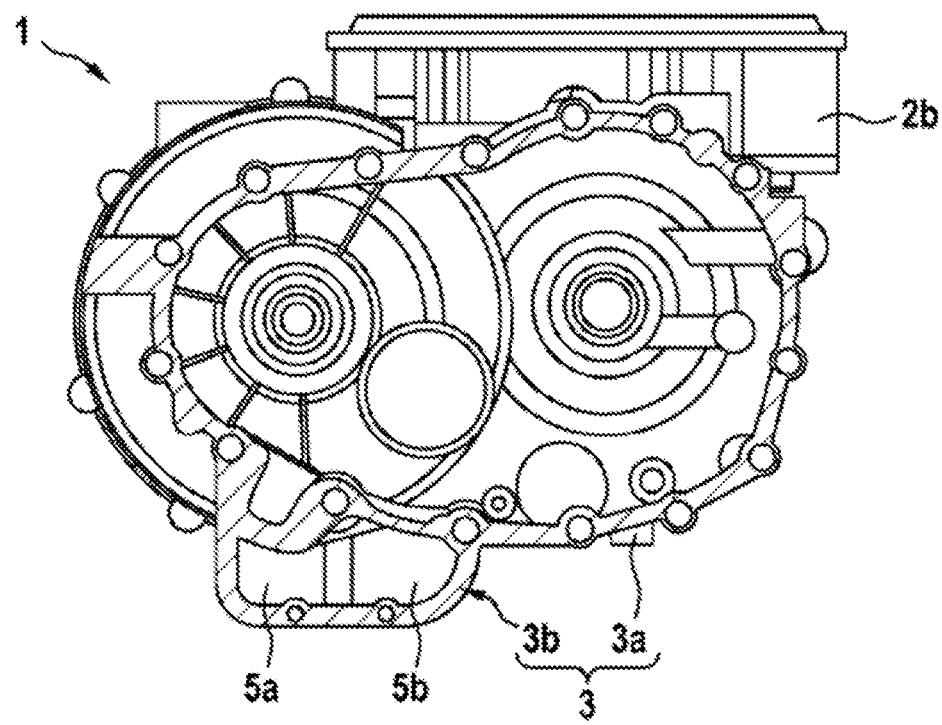
FIG. 5 shows a schematic rear view of the housing for a drive system with a partial sectional view according to the section A-A in FIG. 3.

FIG. 5 shows a schematic rear view of the housing 1 for a drive system with a partial sectional view according to the section A-A in FIG. 3. The second coolant channel 5 comprises a first coolant channel portion 5a which is connected to the first coolant channel and a second coolant channel portion 5b which is connected to the third coolant channel and runs parallel to the first coolant channel portion 5a. The coolant flows through the first coolant channel portion 5a and the second coolant channel portion 5b in an anti-parallel manner during operation.

Figure 6:
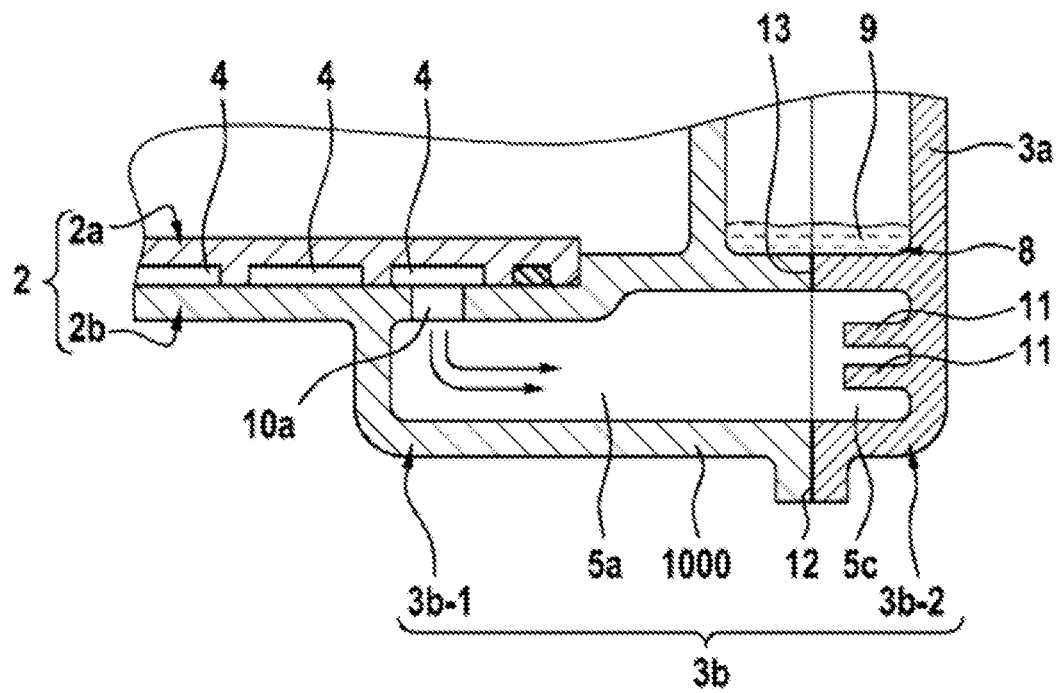
FIG. 6 shows a schematic sectional view of a part of the housing for a drive system according to the section B-B in FIG. 4.

FIG. 6 shows a schematic sectional view of a part of the housing 1 for a drive system according to the section B-B in FIG. 4. After the coolant flows through the helical first coolant channel 4, it enters through the opening 10a into the first coolant channel portion 5a. Adjoining the first coolant channel portion 5a is a third coolant channel portion 5c which is of U-shaped configuration and which connects the first coolant channel portion 5a to the second coolant channel portion 5b which runs parallel to the first coolant channel portion 5a. Ribs 11 which increase the surface area are formed in the third coolant channel portion 5c. The third coolant channel portion 5c runs below a transmission sump region 8 for receiving transmission oil 9.

The third coolant channel portion 5c is at least partially formed by the transmission cover 3a which is connected to the system housing 1000, wherein seals 12, 13, which prevent transmission oil 9 from entering into the third coolant channel portion 5c or coolant from being able to exit or enter the surrounding air, are provided. The seal can be configured, for example, as a cap seal, wet seal, insert seal or the like.

The invention is not limited to the embodiment shown. For example, it can be provided that the first to third coolant channel portions 5a, 5b, 5c are formed in one piece.

Figure 7:
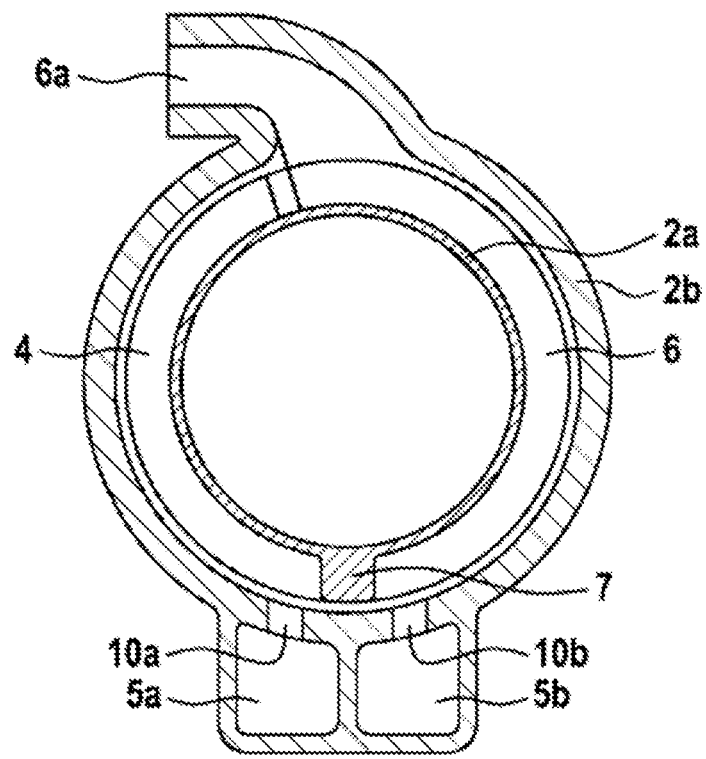
FIG. 7 shows a schematic sectional view of the housing for a drive system according to the section C-C in FIG. 3.

FIG. 7 shows a schematic sectional view of the housing 1 for a drive system according to the section C-C in FIG. 3. The first opening 10a, through which the coolant enters from the first coolant channel 4 into the first coolant channel portion 5a of the second coolant channel 5, is illustrated. A second opening 10b which corresponds to the first opening 10a and through which the coolant enters the third coolant channel 6 and then exits through the coolant outlet 6a is also shown.

The first coolant channel 4 is separated from the third coolant channel 6 by a web 7. This web preferably prevents coolant from the first coolant channel 4 from directly entering the third coolant channel 6. However, it can also be provided that the web 7 is partially permeable.

Figure 8:
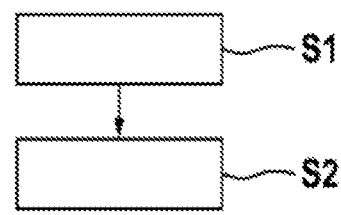
FIG. 8 shows a flow diagram of a method for producing a housing for a drive system according to an embodiment of the invention.

FIG. 8 shows a flow diagram of a method for producing a housing for a drive system.

In a first method step S1, a first housing portion 2 is formed for receiving a stator 5 of the drive system.

In a second method step S2, a second housing portion is formed for receiving a transmission arrangement G. A first coolant channel 4 for cooling the stator is formed in the first housing portion 2. A second coolant channel 5 for cooling the transmission arrangement G is formed in the second housing portion 3. The first coolant channel 4 is fluidically connected to the second coolant channel 5 such that the coolant can be conducted from the first coolant channel 4 into the second coolant channel 5.

For producing the housing 1 it can be provided, in particular, that a transmission cover 3a is connected by means of seals 12, 13 to a system housing 1000.

The invention claimed is:

1. A housing (1) for a drive system comprising:
   a first housing portion (2) for receiving a stator of the drive system; and
   a second housing portion (3) for receiving a transmission arrangement (G);
   wherein a first coolant channel (4) for cooling the stator is formed in or on the first housing portion (2), and wherein a second coolant channel (5) for cooling the transmission arrangement (G) is formed in or on the second housing portion (3), and wherein the first coolant channel (4) is fluidically connected to the second coolant channel (5) such that a coolant can be conducted through the first coolant channel (4) into the second coolant channel (5), wherein the first housing portion (2) also has a third coolant channel (6) which is fluidically connected to the second coolant channel (5), wherein the first coolant channel (4) has a coolant inlet for an inlet of the coolant, and wherein the third coolant channel (6) has a coolant outlet (6a) for an outlet of the coolant.

2. The housing (1) as claimed in claim 1, wherein the first coolant channel (4) is at least partially fluidically separated from the third coolant channel (6) by a web (7).

3. The housing (1) as claimed in claim 1, wherein the second coolant channel (5) has a first coolant channel portion (5a) which is directly connected to the first coolant channel (4), and a second coolant channel portion (5b) which is directly connected to the third coolant channel (6) and runs parallel to the first coolant channel portion (5a), wherein the coolant flows through the first coolant channel portion (5a) and the second coolant channel portion (5b) in an anti-parallel manner during operation.

4. The housing (1) as claimed in claim 3, wherein the second coolant channel (5) has a third coolant channel portion (5c) which connects the first coolant channel portion (5a) to the second coolant channel portion (5b).

5. The housing (1) as claimed in claim 4, wherein the second housing portion (3) has a transmission sump region (8) for receiving transmission oil (9) and wherein the third coolant channel portion (5c) adjoins the transmission sump region (8).

6. The housing (1) as claimed in claim 1, wherein the first housing portion (2) has an inner stator housing portion (2a) for receiving the stator and an outer stator housing portion (2b), and wherein the first coolant channel (4) runs in a helical manner or meandering manner between the inner stator housing portion (2a) and the outer stator housing portion (2b).

7. The housing (1) as claimed in claim 1, wherein the first coolant channel (4) is connected to the second coolant channel (5) via a transfer bore (10a), a sleeve or an opening.

8. The housing (1) as claimed in claim 1, wherein structures (11) for increasing surface area are formed in the first coolant channel (4) and/or in the second coolant channel (5).

9. The housing (1) as claimed in claim 1, wherein the first housing portion (2) is at least partially formed by a system housing (1000), wherein the second housing portion (3) is at least partially formed by a transmission cover, wherein the transmission cover at least partially forms the second coolant channel (5), and wherein the transmission cover is connected to the system housing by at least one sealing element (12, 13).

10. A method for producing a housing (1) for a drive system comprising the steps:
    forming (S1) a first housing portion (2) for receiving a stator of the drive system; and
    forming (S2) a second housing portion (3) for receiving a transmission arrangement (G);
    wherein a first coolant channel (4) for cooling the stator is formed in or on the first housing portion (2), wherein a second coolant channel (5) for cooling the transmission arrangement (G) is formed in or on the second housing portion (3), wherein the first coolant channel (4) is fluidically connected to the second coolant channel (5) such that a coolant can be conducted through the first coolant channel (4) into the second coolant channel (5) and wherein the first housing portion (2) also has a third coolant channel (6) which is fluidically connected to the second coolant channel (5), wherein the first coolant channel (4) has a coolant inlet for an inlet of the coolant, and wherein the third coolant channel (6) has a coolant outlet (6a) for an outlet of the coolant.

11. The housing (1) as claimed in claim 1, wherein the housing is part of a motor vehicle drive system.

12. The housing (1) as claimed in claim 2, wherein the second coolant channel (5) has a first coolant channel portion (5a) which is directly connected to the first coolant channel (4), and a second coolant channel portion (5b) which is directly connected to the third coolant channel (6) and runs parallel to the first coolant channel portion (5a), wherein the coolant flows through the first coolant channel portion (5a) and the second coolant channel portion (5b) in an anti-parallel manner during operation.

13. The housing (1) as claimed in claim 8, wherein the structures (11) for increasing the surface area are ribs.

14. The method as claimed in claim 10, wherein the housing is part of a motor vehicle drive system.

15. A housing (1) for a drive system comprising:
a first housing portion (2) for receiving a stator of the drive system; and
a second housing portion (3) for receiving a transmission arrangement (G);
wherein a first coolant channel (4) for cooling the stator is formed in or on the first housing portion (2), wherein a second coolant channel (5) for cooling the transmission arrangement (G) is formed in or on the second housing portion (3), wherein the first coolant channel (4) is fluidically connected to the second coolant channel (5) such that a coolant can be conducted through the first coolant channel (4) into the second coolant channel (5), wherein the first housing portion (2) is at least partially formed by a system housing (1000), wherein the second housing portion (3) is at least partially formed by a transmission cover, wherein the transmission cover at least partially forms the second coolant channel (5), wherein the transmission cover is connected to the system housing by at least one sealing element (12, 13), and wherein the at least one sealing element (12, 13) prevents coolant from exiting to surrounding air.

16. The housing as claimed in claim 15, wherein the at least one sealing element (12, 13) is configured as a cap seal, a wet seal, or an insert seal.

* * * * *